(12) United States Patent
Herman et al.

(10) Patent No.: US 8,534,123 B2
(45) Date of Patent: Sep. 17, 2013

(54) ENGINE AIR FILTER REPLACEMENT INDICATION SYSTEM

(75) Inventors: Peter K. Herman, Stoughton, WI (US); Roger L. Zoch, McFarland, WI (US); Scott W. Schwartz, Cottage Grove, WI (US); Mark P. Adams, Madison, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 188 days.

(21) Appl. No.: 13/161,014

(22) Filed: Jun. 15, 2011

(65) Prior Publication Data

US 2011/0308308 A1 Dec. 22, 2011

Related U.S. Application Data

(60) Provisional application No. 61/355,856, filed on Jun. 17, 2010.

(51) Int. Cl.
*G01M 15/04* (2006.01)

(52) U.S. Cl.
USPC .................................... 73/114.31; 73/114.37

(58) Field of Classification Search
USPC ................. 73/114.31, 114.32, 114.33, 114.37
See application file for complete search history.

(56) References Cited

U.S. PATENT DOCUMENTS

| | | |
|---|---|---|
| 3,412,786 A | 11/1968 | Taylor |
| 4,107,037 A | 8/1978 | Cavanaugh et al. |
| 4,146,887 A | 3/1979 | Magnante |
| 4,154,586 A | 5/1979 | Jones et al. |
| 4,155,358 A | 5/1979 | McAllister et al. |
| 4,231,768 A | 11/1980 | Seibert et al. |
| 4,237,726 A | 12/1980 | Peterson et al. |
| 4,305,782 A | 12/1981 | Ostreicher et al. |
| 4,326,514 A | 4/1982 | Eian |
| 4,366,068 A | 12/1982 | Ostreicher et al. |
| 4,421,719 A | 12/1983 | Burleigh |
| 4,530,706 A | 7/1985 | Jones |
| 4,562,529 A | 12/1985 | Drummond |
| 4,684,380 A | 8/1987 | Leichnitz |
| 4,685,066 A | 8/1987 | Hafele et al. |
| 4,796,467 A | 1/1989 | Burt et al. |
| 4,859,340 A | 8/1989 | Hou et al. |
| 5,351,523 A | 10/1994 | Blackford et al. |
| 5,376,554 A | 12/1994 | Vo-Dinh |
| 5,512,882 A | 4/1996 | Stetter et al. |
| 5,604,306 A * | 2/1997 | Schricker ................... 73/114.31 |
| 5,659,296 A | 8/1997 | Debe et al. |
| 5,666,949 A | 9/1997 | Debe et al. |

(Continued)

OTHER PUBLICATIONS

International Preliminary Report on Patentability for PCT/US2011/040495 dated Jan. 3, 2013.

(Continued)

*Primary Examiner* — Eric S McCall
(74) *Attorney, Agent, or Firm* — Andrus, Sceales, Starke & Sawall, LLP

(57) ABSTRACT

Disclosed are methods and systems for monitoring and indicating the optimal replacement interval for a filter. In particular, the methods and systems may be utilized for monitoring and indicating the optimal replacement interval of an air filter in an internal combustion engine based on parameters that include air filter plugging rate data, engine duty cycle data, pressure drop across the air filter, penalty on fuel consumption, and the cost of air filter replacement.

24 Claims, 16 Drawing Sheets

(56) References Cited

U.S. PATENT DOCUMENTS

| | | |
|---|---|---|
| 5,685,895 A | 11/1997 | Hagiwara et al. |
| 5,796,007 A | 8/1998 | Panagotopulos et al. |
| 5,817,231 A | 10/1998 | Souza |
| 5,855,784 A | 1/1999 | Pike et al. |
| 5,856,198 A | 1/1999 | Joffe et al. |
| 5,968,371 A | 10/1999 | Verdegan et al. |
| 5,976,881 A | 11/1999 | Klingner |
| 6,009,404 A | 12/1999 | Eimer |
| 6,014,889 A | 1/2000 | Castor |
| 6,040,777 A | 3/2000 | Ammann et al. |
| 6,162,281 A | 12/2000 | Ammann et al. |
| 6,186,140 B1 | 2/2001 | Hoague |
| 6,339,745 B1 | 1/2002 | Novik |
| 6,375,725 B1 | 4/2002 | Bernard et al. |
| 6,497,756 B1 | 12/2002 | Curado et al. |
| 6,584,768 B1 | 7/2003 | Hecker et al. |
| 6,645,277 B1 | 11/2003 | Franz et al. |
| 6,701,864 B2 | 3/2004 | Watson, Jr. et al. |
| 6,736,980 B2 | 5/2004 | Moscaritolo |
| 6,812,035 B1 | 11/2004 | Spitler et al. |
| 7,032,573 B2 * | 4/2006 | Ardisana ........................ 123/434 |
| 7,174,273 B2 | 2/2007 | Goldberg |
| 7,442,237 B1 | 10/2008 | Gardner |
| 7,860,662 B2 | 12/2010 | Parham et al. |
| 7,922,914 B1 | 4/2011 | Verdegan et al. |
| 2004/0217872 A1 | 11/2004 | Bhardwaj et al. |
| 2006/0190149 A1 | 8/2006 | Lapant |
| 2008/0229720 A1 | 9/2008 | Benscoter et al. |
| 2008/0269977 A1 | 10/2008 | Palladino |
| 2011/0094297 A1 * | 4/2011 | Guzman et al. ............ 73/114.31 |

OTHER PUBLICATIONS

International Search Report for PCT/US2011/040495 dated Oct. 5, 2011.

Written Opinion for PCT/US2011/040495 dated Oct. 5, 2011.

* cited by examiner

ENGINE AIR FILTER REPLACEMENT INDICATION SYSTEM

CROSS-REFERENCE TO RELATED APPLICATIONS

The present application claims the benefit of priority to U.S. Provisional Application No. 61/355,856, filed on Jun. 17, 2010, which is incorporated herein by reference in its entirety.

BACKGROUND

The field of the invention relates to filters. In particular, the field of the invention relates to systems for monitoring a filter and indicating the optimal replacement interval for an air filter in an internal combustion engine.

SUMMARY

Disclosed are methods and systems for monitoring and indicating the optimal replacement interval for a filter. In particular, the methods and systems may be utilized for monitoring and indicating the optimal replacement interval of an air filter in an internal combustion engine.

The methods and systems utilizing the methods may include one or more of the following steps: (a) sensing air filter plugging rate data and engine duty cycle data; (b) providing an algorithm that accounts for (i) pressure drop across the air filter (i.e., "dP" or "$\Delta P$"), (ii) penalty on fuel consumption which may be caused by dP, and (iii) the cost of air filter replacement; and (c) providing an indication to a user of an optimum air filter replacement interval. In some embodiments of the disclosed methods, the cost of air filter replacement includes the cost of a new air filter plus the cost of replacement service. In further embodiments of the disclosed methods, the replacement service cost includes the cost of down time.

The presently disclosed methods include one or more of the following steps: (a) determining a first changing cost based on increasing incremental fuel cost per mile due to increasing dP per mile; (b) determining a second changing cost based on decreasing air filter cost per mile of usage; (c) summing the first and second changing costs to provide a changing sum; and (d) providing an indication to a user of an optimum air filter replacement interval when the changing sum is at a minimum. In some embodiments, the methods may include determining the first changing cost, the second changing cost, and the changing sum on a graph that has an abscissa of miles between air filter replacement and an ordinate of cost per mile. In other embodiments, the methods may include determining the first changing cost, the second changing cost, and the changing sum on a graph that has an abscissa of air intake restriction and an ordinate of cost per mile.

The presently disclosed methods may include one or more of the following steps: (a) determining a first changing cost based on increasing incremental fuel cost per hour due to increasing dP per hour; (b) determining a second changing cost based on decreasing air filter cost per hour of usage; (c) summing the first and second changing costs to provide a changing sum; (d) providing an indication to a user of an optimum air filter replacement interval when the changing sum is at a minimum. In some embodiments, the methods may include determining the first changing cost, the second changing cost, and the changing sum on a graph that has an abscissa of hours between air filter replacement and an ordinate of cost per mile. In other embodiments, the methods may include determining the first changing cost, the second changing cost, and the sum on a graph that has an abscissa of air intake restriction and an ordinate of cost per mile.

The disclosed methods may include providing an indication to a user of an optimum air filter replacement interval. In some embodiments, the methods may include providing a pre-indication alert to the user prior to providing the indication of an optimum air filter replacement interval. For example, the pre-indication alert may be provided in advance miles prior to the optimum air filter replacement interval. Alternatively, the pre-indication alert may be provided in advance hours prior to the optimum air filter replacement interval. In further embodiments, the pre-indication alert may advise the user to change the air filter at the next scheduled service interval.

The disclosed methods may utilize an algorithm that accounts for (i) pressure drop across the air filter (i.e., "dP" or "$\Delta P$"), (ii) penalty on fuel consumption which may be caused by dP, and (iii) the cost of air filter replacement. In some embodiments of the disclosed methods, the utilized algorithm assumes that dP changes linearly with respect to at least one of miles of usage and hours of usage. In further embodiments of the disclosed methods, the utilized algorithm assumes that fuel consumption changes linearly with respect to dP. In even further embodiments of the disclosed methods, the utilized algorithm assumes: (1) that dP changes linearly with respect to at least one of miles of usage and hours of usage; (2) that fuel consumption changes linearly with respect to dP; and (3) that fuel consumption changes linearly with respect to at least one of miles of usage and hours of usage. In even further embodiments of the disclosed methods, the utilized algorithm may assume pre-determined relationship between dP, fuel consumption and at least one of miles of usage and hours of usage. For example, the pre-determined relationships may be selected from a group consisting of linear, exponential, quadratic, and power relationships.

The disclosed methods may be utilized by a system for monitoring and indicating the optimal replacement interval of an air filter in an internal combustion engine. In some embodiments, the engine includes an electronic control unit or module (ECU or ECM) that utilizes the disclosed algorithm where the ECU is on-board the engine. For example, the ECU may provide input values for the algorithm and/or may accept output values from the algorithm. In other embodiments, the algorithm is utilized by a service tool device that is separate from the engine. The service tool may automatically accesses fleet records or data that includes air filter cost, fuel cost, and down-time cost during servicing for air filter replacement.

The disclosed methods may include sensing air filter plugging rate data. In some embodiments, the sensed air filter plugging rate data may be corrected based on air flow. In further embodiments, the sensed air filter plugging rate data may be subjected to linear regression via root-mean-square error-minimization in order to provide smoothing thereof and prevent false or premature triggering of a filter replacement signal. Alternatively, a rolling average of sensed air filter plugging rate data may be taken. In even further embodiments, the air filter plugging rate may be recorded during pre-determined air flow-rate conditions to facilitate consistency and uniformity of data points relative to each other and integrity of comparison. The pre-determined air flow-rate conditions may include a selected flow-rate that is high enough to reduce error percentage. Further, the selected flow-rate may be normalized to a fixed flow rate condition.

DETAILED DESCRIPTION

Figure 1:
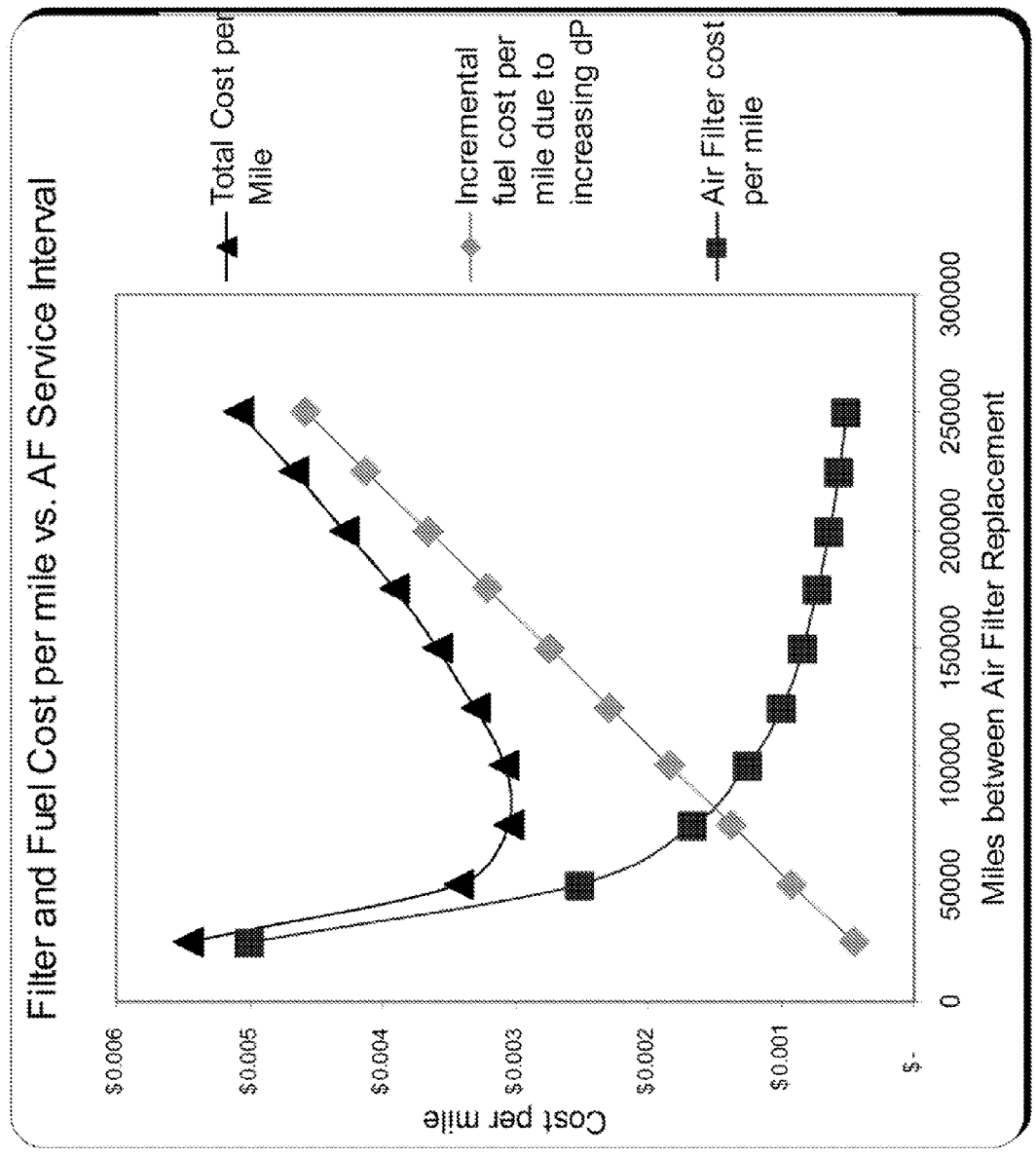
FIG. 1 illustrates the cost per mile versus replacement interval in miles.

The present methods, systems, and algorithms may be described herein using several definitions, as set forth below and throughout the application.

Unless otherwise specified or indicated by context, the terms "a", "an", and "the" mean "one or more." For example, "a system", "a method", or "an algorithm" should be interpreted to mean "one or more systems", "one or more methods", and "one or more algorithms", respectively.

As used herein, "about," "approximately," "substantially," and "significantly" will be understood by persons of ordinary skill in the art and will vary to some extent on the context in which they are used. If there are uses of these terms which are not clear to persons of ordinary skill in the art given the context in which they are used, "about" and "approximately" will mean plus or minus $\leq 10\%$ of the particular term and "substantially" and "significantly" will mean plus or minus $>10\%$ of the particular term.

As used herein, the terms "include" and "including" have the same meaning as the terms "comprise" and "comprising." For example, a "system including a sensor" should be interpreted to mean "a system comprising a sensor."

As used herein, the term "the" may be used interchangeably with the term "said." For example, "the system" may be interchangeably referred to as "said system."

As used herein, a "user" may include someone who makes filters (i.e., a "manufacturer") and someone who purchases and uses the filter (i.e., a "customer" or an "operator"). A "user" further may include someone who is replaces a filter (e.g., "service personnel").

As used herein, the terms "replace" or "change" may be utilized interchangeably herein and refer to the process of removing a previously installed filter and installing a new filter.

The presently disclosed methods and systems may be utilized for monitoring and indicating the optimal replacement interval of an air filter in an internal combustion engine. For example, the presently disclosed methods and systems may be utilized to reduce the operating cost of an air filter by providing an operator (e.g., via an electronic output display or an interface with an electronic control unit (ECU), with an economically optimum air filter replacement interval (e.g., based on lowest cost per mile of usage or hour of usage) via sensing air filter plugging rate and engine duty cycle, combined with a calculation using an algorithm that accounts for a penalty based on dP (i.e., "delta" or "differential" pressure) a penalty based on increased fuel consumption, and cost of air filter replacement (e.g., cost of a new air filter and cost of replacement service).

Historically, an air filter for a turbo-diesel engine has been defined as "plugged" when the restriction level across the filter, for example as measure by dP, is greater than about 25 in $H_2O$. At this restriction level, replacement of the air filter typically has been recommended. This recommended replacement interval based on a restriction level of 25 in $H_2O$) was developed at a time when diesel fuel was less than about $0.5/gallon. Currently, diesel fuel is greater than $4/gallon. Based on this higher cost for fuel, it has been determined that the economically optimum replacement interval for air filter change is likely significantly less than 25 in $H_2O$ and possibly as low as 10-15 in $H_2O$, due to higher cost of fuel consumption based on dP (i.e., the higher cost of the dP penalty on fuel consumption). The optimum replacement interval may be calculated based on fuel consumption, filter plugging rate, and cost of filter replacement using a defined algorithm. The disclosed methods and systems may utilize the defined algorithm to lower fuel consumption, operating cost, and $CO_2$ emissions.

The disclosed methods and systems utilize an algorithm that may calculate an optimum replacement interval based on inputs, intermediate calculations, and outputs. For example, input may include one or more of: cost of replacement air filter element; cost for service and/or downtime; diesel fuel price; average fuel economy of truck; initial (clean) air intake system restriction; plugged air filter restriction specification (usually specified as 25 in $H_2O$ by manufacturer); miles travelled per year (for annualized calculations); and typical mileage to reach plugged air filter restriction. Intermediate calculations may include one or more of: allowable air filter restriction rise; nominal fuel cost burned per year; maximum air filter restriction penalty cost (i.e., under plugged restriction); incremental plugged air filter restriction penalty cost; filter hardware plus service cost; filter hardware plus service cost per mile; total incremental fuel, filter, and service cost per mile; and total incremental fuel, filter, and service cost per year. Outputs may include one or more of: air filter maximum restriction fuel economy penalty for "plugged" air filter condition versus initial condition; approximate optimum air filter replacement interval; approximate optimum air intake restriction for air filter replacement; and maximum savings per year by changing air filter at optimum dP instead of at "plugged" dP. Tables 1 and 2 illustrate sample inputs, intermediate calculations, and outputs for on-highway, mileage-based inputs (Table 1) and off-highway, hourly-based inputs (Table 2).

TABLE 1

| Inputs: | | |
|---|---|---|
| Cost of replacement air filter element | $75 | |
| Cost for service and/or downtime | $50 | |
| Diesel fuel price | $2.50 | $/gal |
| Average fuel economy of truck | 6.5 | miles/gal |
| Initial (clean) air intake system restriction | 8 | in H2O |
| Plugged AF restriction spec (usually spec'd at 25 by engine manufacturer) | 25 | in H2O |
| Miles travelled per year (for annualized calc's) | 100000 | miles/year |
| Typ. Mileage to reach "plugged AF" restriction (input defines plugging rate) | 250000 | miles |
| Intermediate calc's: | | |
| Allowable AF restriction rise | 17 | in H2O |
| Nominal fuel cost burned/year | $38,462 | |
| Max (plugged) AF restriction penalty cost | $458 | per year |
| Incremental plugged AF restriction penalty cost | $0.005 | per mile |
| Filter hardware + service cost | $125.00 | per change |
| Filter hardware + service cost per mile | $0.001 | per mile |
| Total incremental fuel + filter + service cost per mile | $0.005 | per mile |
| Total incremental fuel + filter + service cost per year | | |
| Outputs: | | |
| AF maximum restriction fuel economy penalty for "plugged AF" condition vs. initial | 1.2% | |
| Approximate optimum AF replacement interval | 75000 | miles |
| Approximate optimum air intake restriction for AF replacement | 13.1 | in H2O |
| Max savings per year by changing AF at optimum dP instead of at "plugged" dP mileage | $204 | per year |

TABLE 2

| Inputs: | | |
|---|---|---|
| Cost of replacement air filter element | $75 | |
| Cost for service and/or downtime | $50 | |
| Diesel fuel price | $2.50 | $/gal |
| Average rate of fuel consumption | 10 | gal/hr |
| Initial (clean) air intake system restriction | 8 | in H2O |
| Plugged AF restriction spec (usually spec'd at 25 by engine manufacturer) | 25 | in H2O |
| Hours operated per year (for annualized calc's) | 2000 | hours |
| Typ. Hours to reach "plugged AF" restriction (input defines filter plugging rate) | 1500 | hours |
| Intermediate calc's: | | |
| Allowable AF restriction rise | 17 | in H2O |
| Nominal fuel cost burned/year | $50,000 | |
| Max (plugged) AF restriction penalty cost | $595 | per year |
| Incremental plugged AF restriction penalty cost | $0.298 | per hour |
| Filter hardware + service cost | $125.00 | per change |
| Filter hardware + service cost per hour | $0.083 | per hour |
| Total incremental fuel + filter + service cost per hour | $0.381 | per hour |
| Total incremental fuel + filter + service cost per year | | |
| Outputs: | | |
| AF maximum restriction fuel economy penalty for "plugged AF" condition vs. initial | 1.2% | |
| Approximate optimum AF replacement interval | 750 | hours |
| Approximate optimum air intake restriction for AF replacement | 16.5 | in H2O |
| Max savings per year by changing AF at optimum dP instead of at "plugged" dP condition | $131 | per year |

Figure 2:
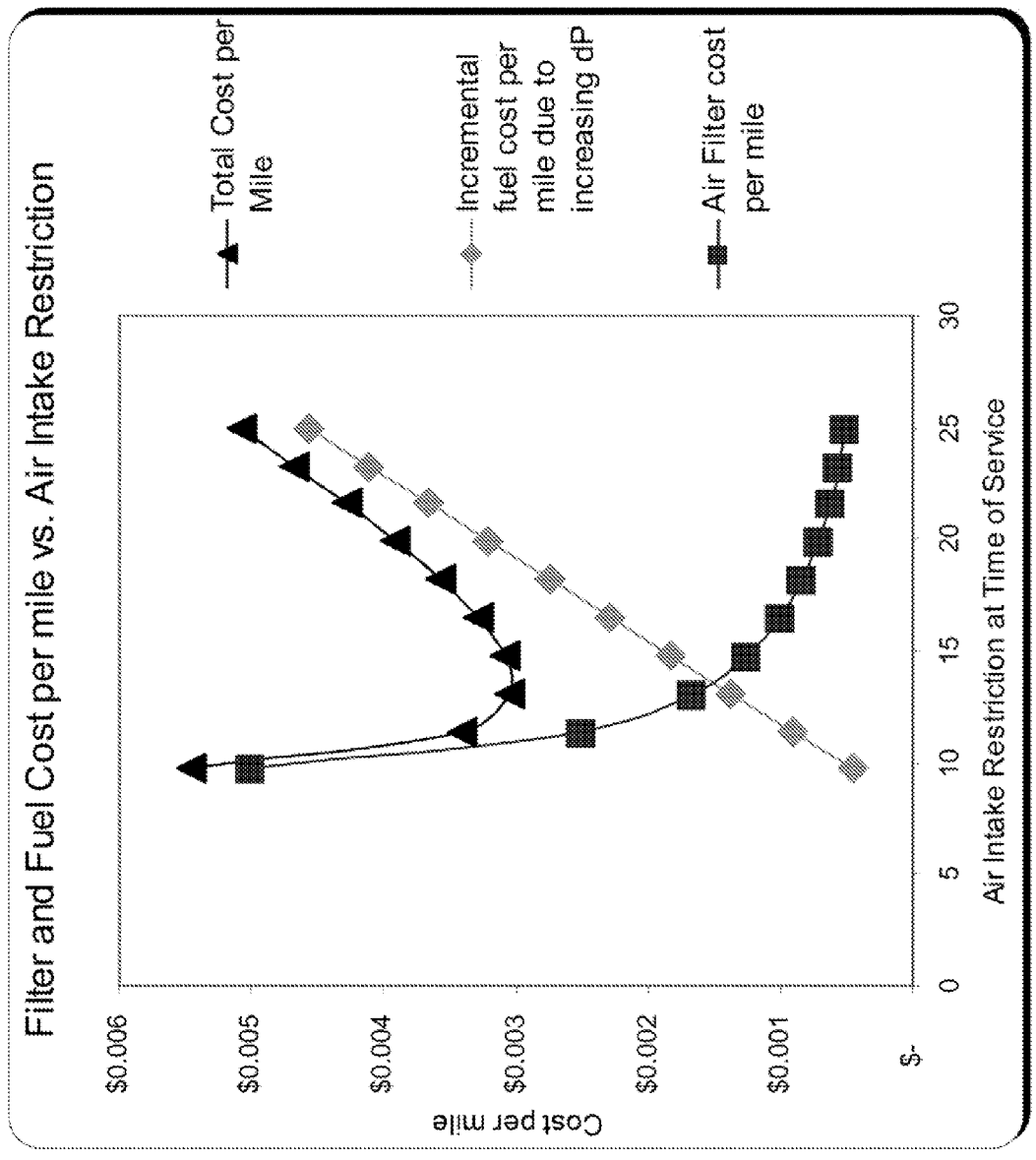
FIG. 2 illustrates the cost per mile versus air filter restriction.

FIGS. 1 and 2 illustrate graphically illustrate a method of determining the lowest cost point for replacing an air filter (i.e., the crossing point between incremental fuel and filter cost curves). Based on the inputs for filter and service cost, the optimum per mile or per hour cost may be calculated, accounting for filter replacement and fuel consumption penalty as dP rises, which may be based on a known relationship or based on data obtained from test-cell experiments or engine-cycle simulation models. If air filter are changed relatively frequently, the filter costs per mile (or per hour) are relatively high. Likewise, as filters are utilized for a relatively longer span of miles (or for a longer period of time), the air filter cost per mile (or per hour) decreases but the fuel cost penalty increases because of increasing dP. The optimum point for replacing a filter is found at the minimum point of the summed costs of incremental fuel penalty cost and air filter cost (or alternatively at the intersection of the incremental fuel penalty cost curve and the filter cost curves. As illustrated in FIGS. 1 and 2, the optimum restriction level at change-point would be ~15 in $H_2O$, vs. the "standard" 25 in $H_2O$ recommendation.

The inputs and outputs of the algorithm may be entered and displayed by hardware including, but not limited to, an electronic control unit (ECU), dashboard lights, and the like. For example, a "yellow" dashboard light may be illuminated when the algorithm determines that an optimum air filter service interval is approaching, and an additional display on the dashboard may indicate that the optimum air filter service interval will be reached in "x" miles or "x" hours, where the values "x" and "x" are determined by the algorithm. A "red" dashboard light may be illuminated when the algorithm determines than the optimum air filter service has been surpassed.

In some embodiments, the algorithm may calculate an optimum change interval solution ("optimum_x") based on Equation 1:

$$\text{optimum\_x} = \frac{\sqrt{C \cdot Fb \cdot Fc \cdot penaltyfactor \cdot (Filtercost + Servicecost)}}{C \cdot Fb \cdot Fc \cdot penaltyfactor}$$

Where the equation inputs are:
C: slope of filter plugging trend (like kPa/mile or kPa/hour)
$F_b$=average fuel burn rate (like gal/mile or gal/hour)
$F_c$=fuel cost (like $/gal)
Filtercost=cost of replacement filter element
Servicecost=cost to replace element (downtime cost, shop charge, etc.)
Penaltyfactor=Engine's fuel consumption response to increasing air intake restriction (i.e. % increase in fuel consumption per restriction unit (like %/kPa or %/in $H_2O$)).

Equation 1 assumes that the filter restriction trend-line is linear and that the rate of engine fuel consumption versus increasing dP is linear. In some embodiments of the presently disclosed methods and systems, these linear assumptions are adequate, since other noise factors (e.g., varying "average" fuel consumption, ambient aerosol concentration and filter loading, fuel cost fluctuations, etc.) may introduce more error or uncertainty than the linear simplification assumptions. However, in other embodiments, alternative equations may be derived and implemented which include non-linear assumptions with respect to filter plugging versus time or mileage (like exponential, quadratic, power) and engine fuel consumption versus increasing air intake restriction.

In Equation I, $dP = P_0 + (C \cdot x)$, where dP is the pressure drop (or differential) across the filter, $P_0$ is the initial pressure drop across the filter, and "x" is miles of usage or hours of usage. The increase in pressure drop $dP_{rise}$ is equal to $C \cdot x$.

The Fuel_penalty=$dP_{rise}$·penaltyfactor. Therefore, the Fuel_penalty=C·x·penaltyfactor.

In some embodiments, a typical penaltyfactor for a turbocharged engine may be about 0.01-0.1%/in $H_2O$, or about 0.02-0.08%/in $H_2O$, or about 0.04-0.06%/in $H_2O$). The penaltyfactor may be ~2.5× larger for a naturally aspirated engine.

The Fuel_consumption_cost=$F_b$·$F_c$ and the Fuel_incremental_cost=$F_b$·$F_c$·Fuelpenalty. Therefore, the Fuel_incremental_cost=$F_b$·$F_c$·C·x·penaltyfactor. This is the cost per mile of the "penalty" fuel consumption due to an increase in air filter restriction.

The Filter_replacement_cost=Filtercost+Servicecost, and the Filter_incremental_cost=(Filtercost+Servicecost)/x. This is the cost per mile (or hour) of the air filter and the service cost and Filter_replacement_cost→∞ as x→0.

An optimum time or mileage for air filter replacement (i.e., optimum_x) occurs where Filter_incremental_cost=Fuel_incremental_cost or where (Filtercost+Servicecost)/x=$F_b$·$F_c$·C·x·penaltyfactor. Solving this equation for optimum_x gives Equation I:

$$\text{optimum\_x} = \frac{\sqrt{C \cdot Fb \cdot Fc \cdot penaltyfactor \cdot (Filtercost + Servicecost)}}{C \cdot Fb \cdot Fc \cdot penaltyfactor}$$

If fuel restriction is assumed to increase exponentially with time (or miles) then dP=$P_0$+$\exp^{(c \cdot x)}$, where dP is the pressure drop (or differential) across the filter, $P_0$ is the initial pressure drop across the filter, and "x" is miles of usage or hours of usage. Accordingly, the increase in pressure drop $dP_{rise}$ is equal to $P_0 \cdot (\exp^{(C \cdot x)} - 1)$. The Fuel_penalty=$P_0$·penaltyfactor·$(\exp^{(C \cdot x)} - 1)$, and the Fuel_incremental_cost=$F_b \cdot F_c \cdot P_0$·penaltyfactor·$(\exp^{(c \cdot x)} - 1)$. An optimum time or mileage for air filter replacement (i.e., optimum_x) occurs where Filter_incremental_cost=Fuel_incremental_cost or where (Filtercost+Servicecost)/x=$F_b \cdot F_c \cdot P_0$·penaltyfactor·$(\exp^{(C \cdot x)} - 1)$. Unlike the equation above where fuel restriction is assumed to increase linearly with time (or miles), this latter equation does not have a closed-form solution for variable "x", but can be solved using numerical methods known in the art, such as the Newton-Raphson method. As an example, using the following inputs, equations, and outputs, the optimum air filter replacement intervals for systems with "exponential" versus "linear" plugging rates may be compared:

$P_0$=4.019;
C=1.83·$10^{-5}$;
$F_b$=1/6.5;
$F_c$=3.5;
penaltyfactor=0.0007;
Filtercost=50;
Servicecost=50;
f(x)=((Filtercost+Servicecost)/x))−($F_b \cdot F_c \cdot P_0$·penaltyfactor·$(\exp^{(C \cdot x)} - 1)$);
x=1000;
r0=root(f(x),x);
r0=47563 miles;
dP=4.019·$e^{1.832 \cdot 10^{-5} \cdot r0}$.

Based on these inputs, equations, and outputs, a system with an exponential plugging rate has an optimum air filter replacement interval at dP=9.606 in $H_2O$.

Figure 3:
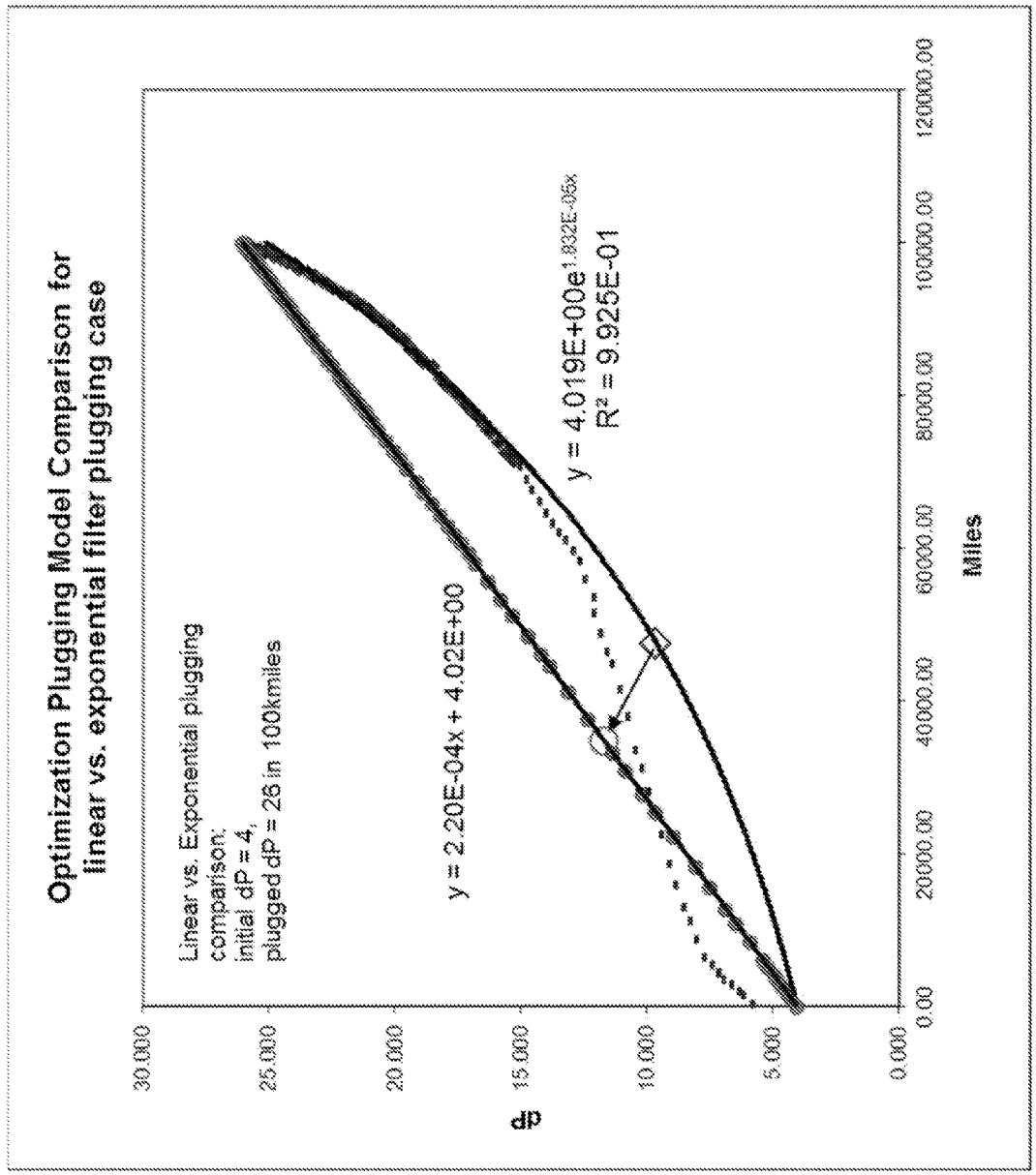
FIG. 3 provides a comparison of plugging rates for a system having a linear plugging rate versus a system having an exponential plugging rate.

This result was compared to a system with a linear plugging rate. The slope required for a system with a linear plugging rate using the same initial dP and same time (or miles) to reach 25 in $H_2O$ as the system with an exponential plugging rate was calculated as C=2.2·$10^{-4}$. (See FIG. 3). Using this value in Equation I, i.e., $$\text{optimum\_x} = \frac{\sqrt{C \cdot Fb \cdot Fc \cdot penaltyfactor \cdot (Filtercost + Servicecost)}}{C \cdot Fb \cdot Fc \cdot penaltyfactor}$$

results in an optimum_x at 34727 miles. Furthermore, dP=(0.00022·optimum_x)+4.02=11.66 in $H_2O$. Therefore, although the optimum mileage at change appears to be quite different due to different shape of the plugging curve (i.e., 47563 miles versus 34727 miles), the results for optimum dP at change are quite similar (i.e., 9.606 in $H_2O$ versus 11.66 in $H_2O$). The linear plugging model provides a slightly conservative (i.e., larger) termination dP at optimum change point.

In some embodiments, Equation I or a version thereof for a system having an exponential or quadratic plugging rate may be utilized in the presently disclosed algorithms and may form the "core" of the algorithm being proposed. Equation I or a version thereof for a system having an exponential or quadratic plugging rate may be utilized by a calculator tool that is present "on-engine" or by an off-engine service calculator tool.

Figure 4:
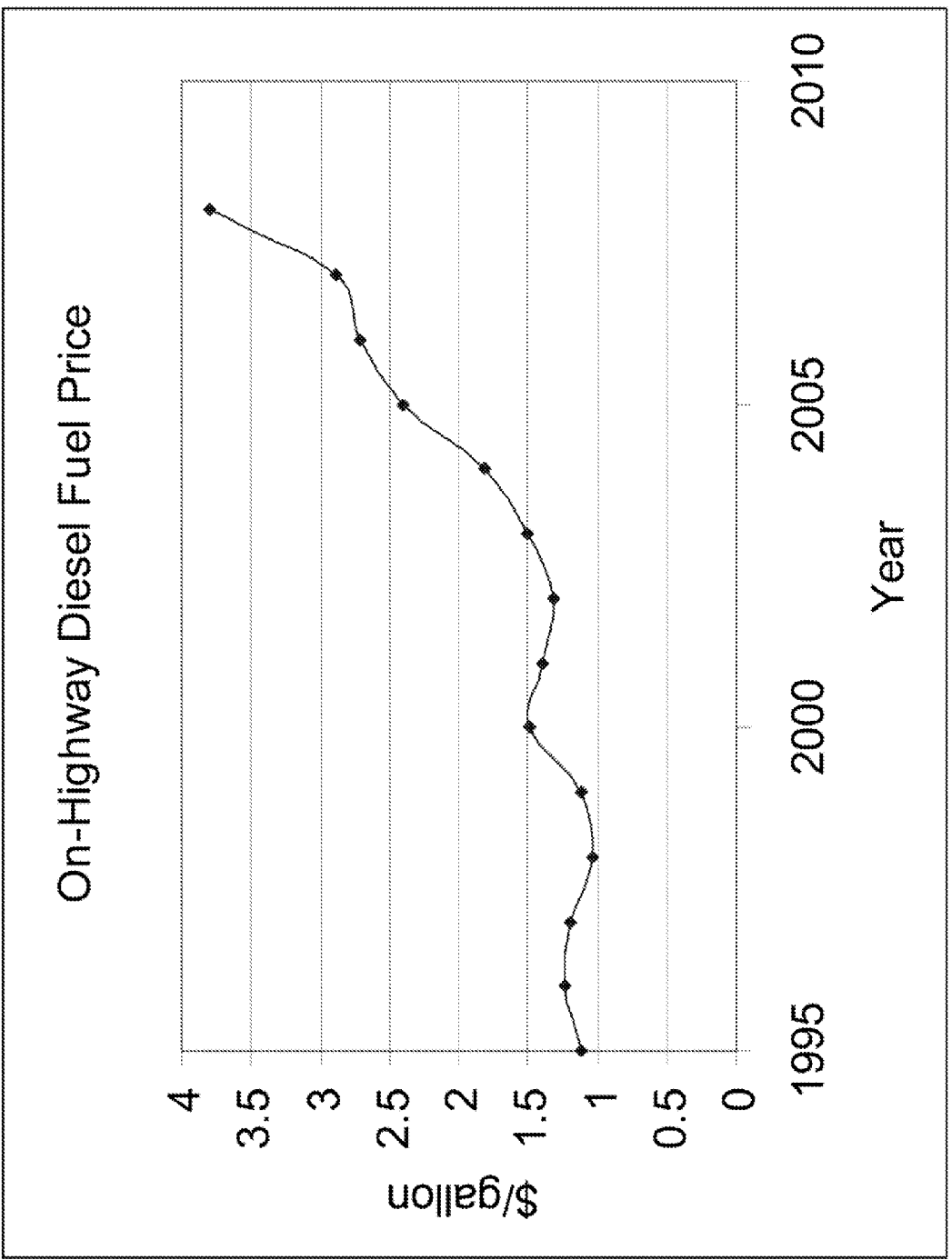
FIG. 4 illustrates the historic price of on-highway diesel fuel.
Figure 5:
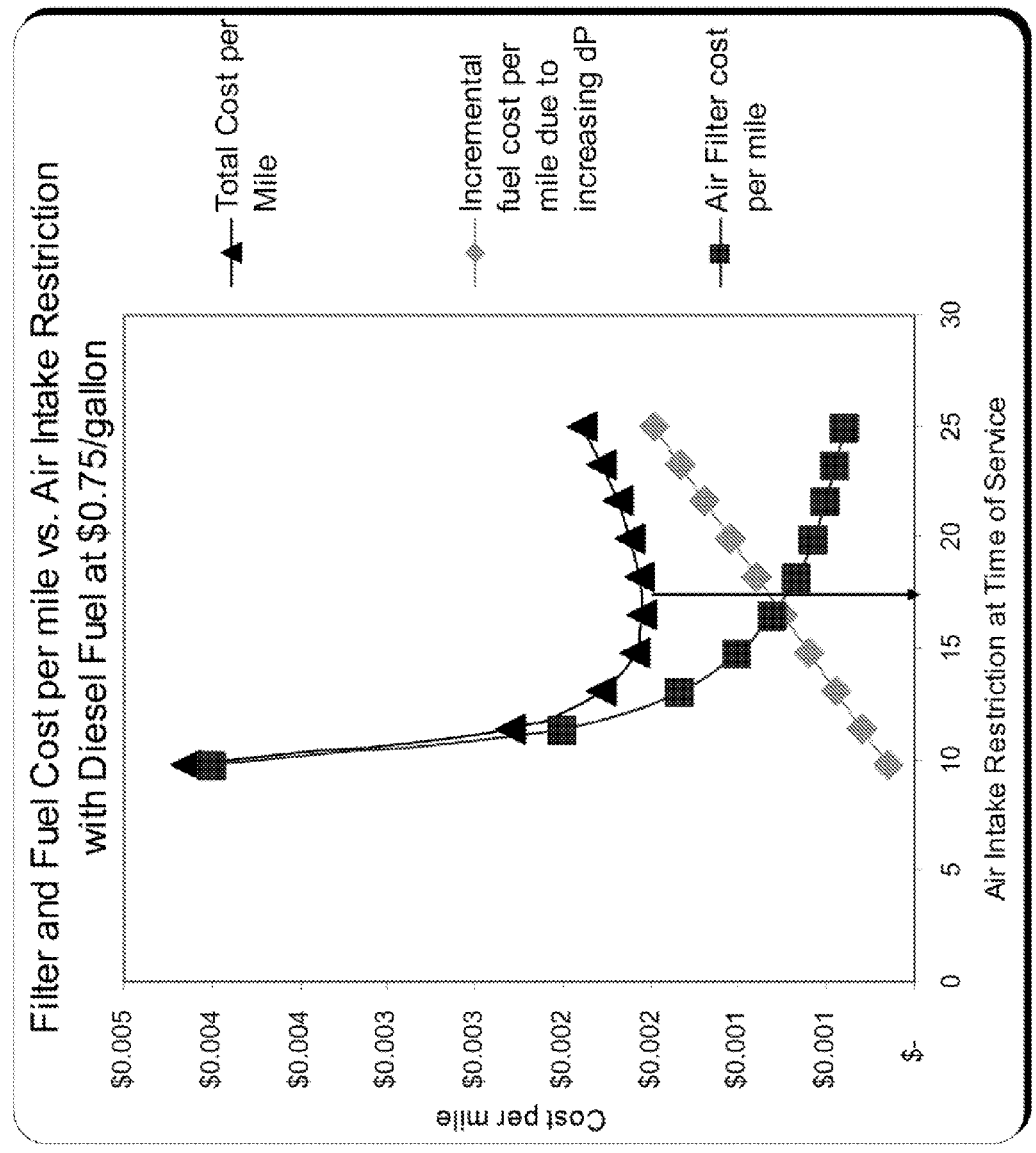
FIG. 5 illustrates the cost per mile versus air filter restriction when diesel fuel is $0.75/gallon.
Figure 6:
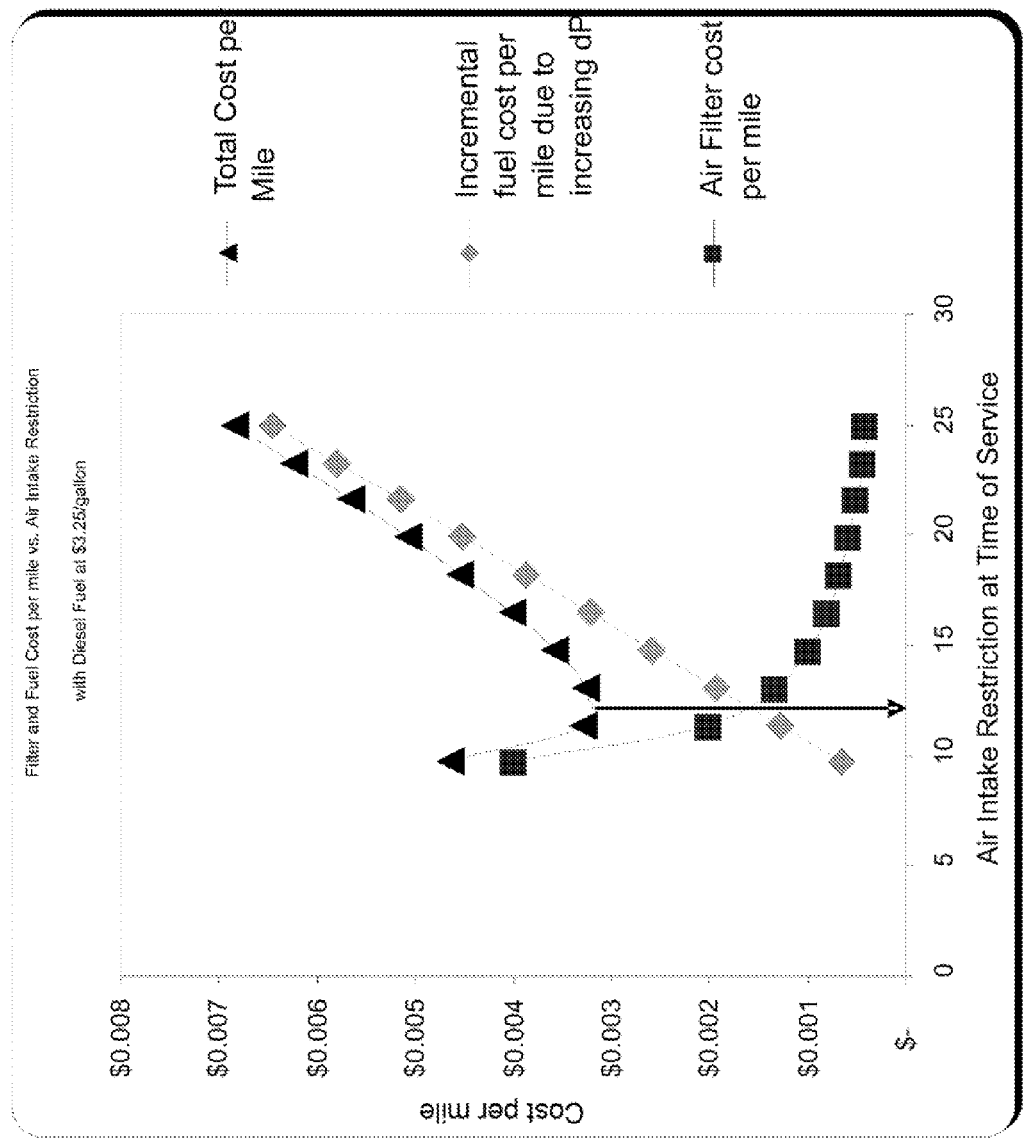
FIG. 6 illustrates the cost per mile versus air filter restriction when diesel fuel is $3.25/gallon.

Historically, the convention requirement for maximum air filter restriction on heavy-duty turbocharged diesel engines where replacement of the air filter is recommended is 25 in $H_2O$. Although this recommendation may have been economically near-optimum 20 years ago when diesel fuel was less than $1 per gallon (see FIG. 4), now that prices are >$4 per gallon, the optimum restriction at change is likely much lower than 25 in $H_2O$, perhaps in the range of 10-15 in $H_2O$. (See FIGS. 5 and 6). In FIG. 5, where diesel fuel is $0.75/gallon, the optimum change point is rather "soft bottomed," suggesting a filter change at ~17 in $H_2O$. In FIG. 6, where diesel fuel is more expensive at $3.25/gallon, the optimum change point is a rather sharp and increases rapidly, suggesting a filter change at ~12 in $H_2O$. The "penalty" for exceeding the optimum change point becomes quickly severe for more expensive fuel.

Figure 7:
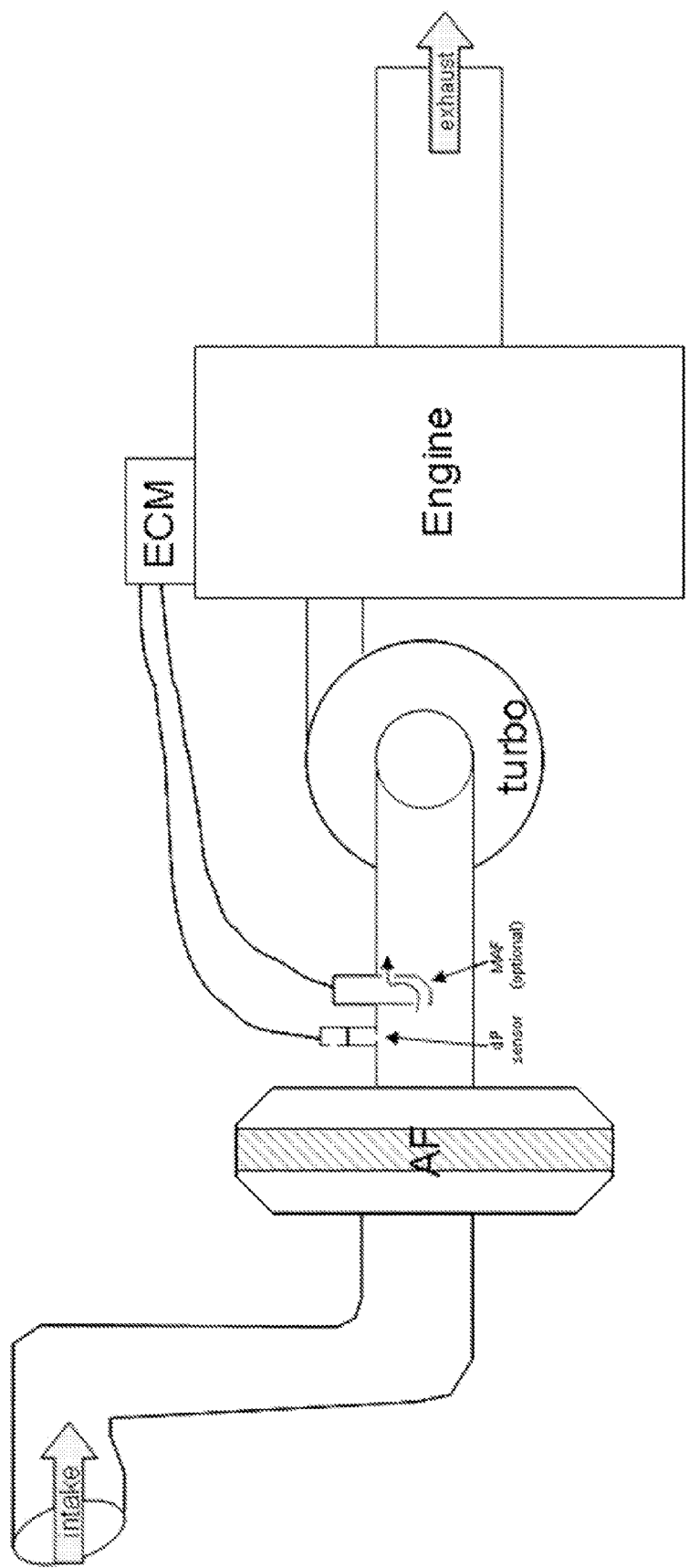
FIG. 7 illustrates one embodiment of a system utilizing methods disclose herein for monitoring and indicating the optimal replacement interval for a filter.

In one embodiment of the present systems and methods, air filter plugging rate may be determined by smoothing the time-based filter sensor dP readings, preferably all taken at some fixed engine speed/power condition in order to ensure equal airflow for each reading. Alternatively, the "peak" restriction found during some fairly significant time interval (e.g., 4 hours) could be stored, smoothed, and trended, assuming that the max airflow is reached at some time during each interval. Or, most preferred. if a mass air flow (MAF) sensor is available, the peak-restriction may be "corrected" to a reference flow (e.g., using knowledge of actual flowrate at time of dP measurement) in order to reduce noise in the dP vs. time signal. Alternatively, an MAF signal may be used to trigger a dP reading at a precise/appropriate flowrate. Because an ECU tracks hours and/or miles, the plugging rate then may be determined and the optimum change point restriction may be calculated. FIG. 7 illustrates a system having an MAF and ECM. The optimum change point may vary because as the duty cycle changes (i.e., as fuel consumption decreases or increases), the fuel penalty cost corresponding moves lower or higher. The fuel consumption input (i.e., miles per gallon or miles per hour) may also be smoothed based on weekly or monthly averages in order to prevent false or premature "change" recommendations.

Some embodiments of the presently disclosed methods and algorithms may include the following steps. In Step 1, timestamped or mileage-stamped air filter dP data are measured and stored (e.g., daily) in a storage device. Preferably, the dP data are flow-corrected via MAF readings or via an inferred flow-rate from ECU output. Linear regression may be performed on the dP data "on-board" or by an "off-board" tool to estimate a plugging slope. In Step 2, when a vehicle is brought in for routine service, data in the storage device is obtained and a filter plugging history or trend is transferred to or calculated by a cost optimization algorithm. Additional inputs for the cost optimization algorithm may include average fuel cost for a fleet of vehicles, specific engine model BSFC (i.e., brake specific fuel consumption) vs. dP response, cost of replacement air filter, and service cost to perform the change. In Step 3, an output decision is generated (i.e., replace air filter or not) based on optimum economic cost with consideration given towards when truck will next be available for servicing. If the optimum replacement point will be exceeded prior to the next scheduled service, the output decision may instruct a user to replace the air filter.

Figure 8:
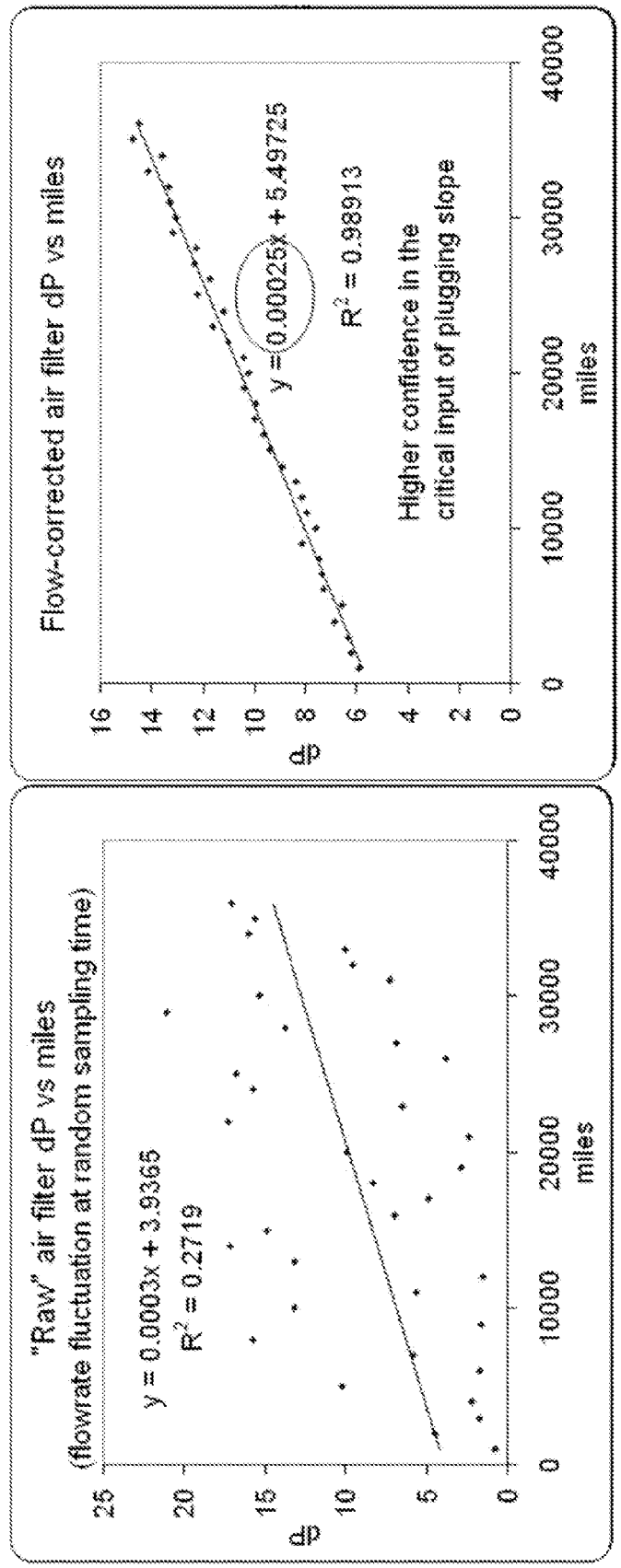
FIG. 8 illustrates a qualitative effect of "correcting" a measured filter restriction to reduce noise using a known flow-rate from a mass air flow sensor or inferred from an ECM condition at the time the pressure differential is measured.
Figure 9:
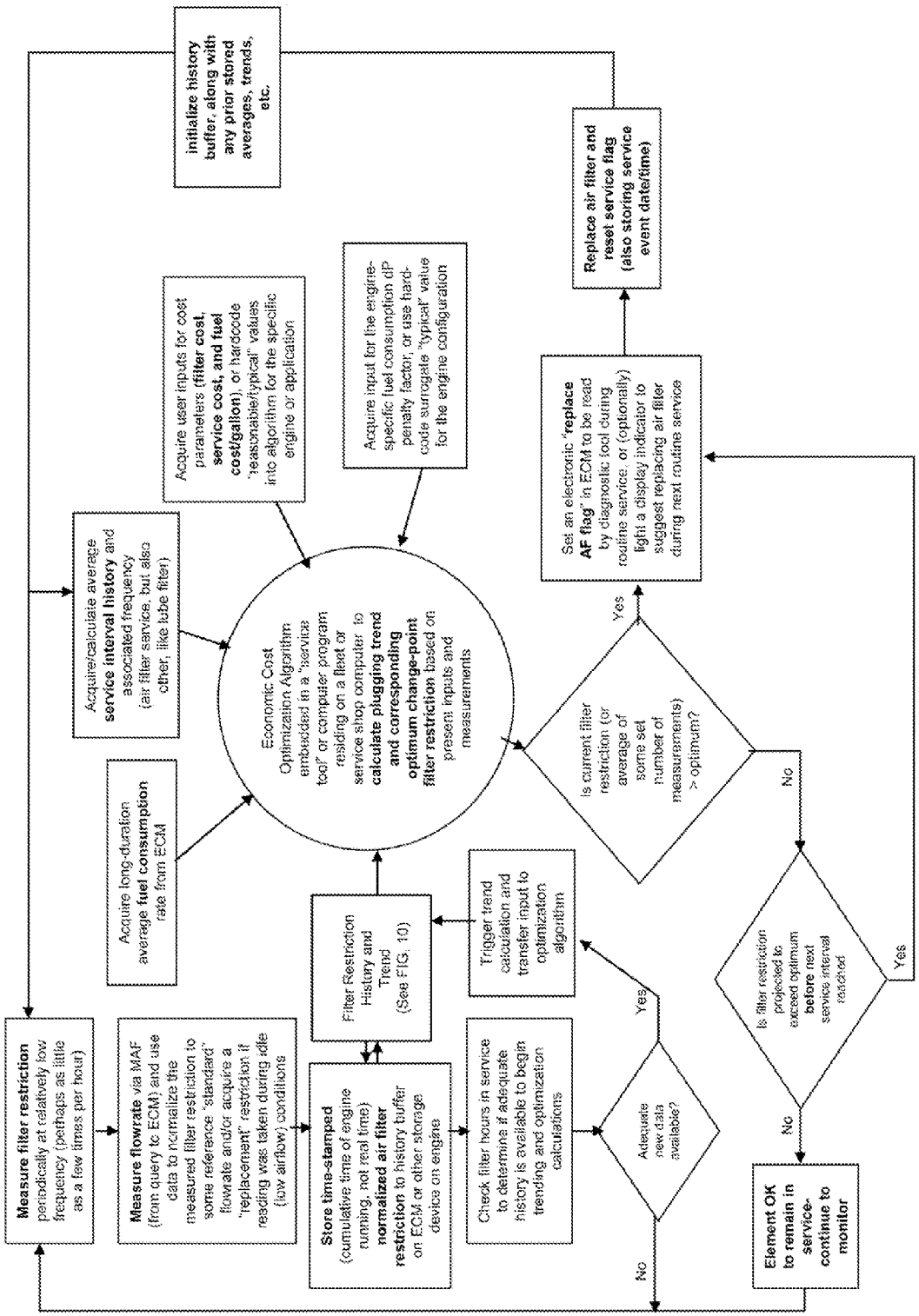
FIG. 9 provides a flowchart example for on-engine measurement of filter plugging rate and on-engine algorithm for optimum service time
Figure 10:
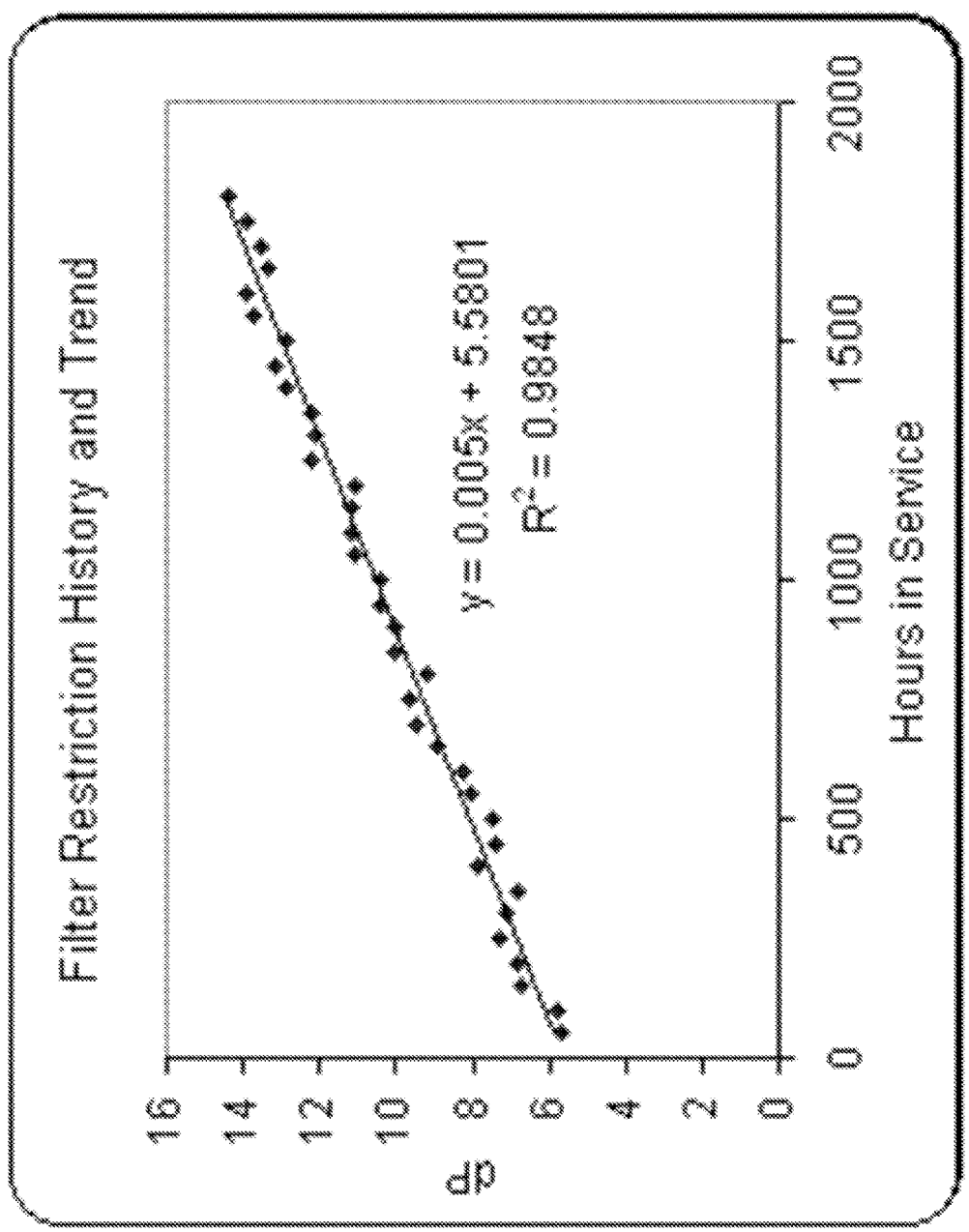
FIG. 10 illustrates graphically a filter restriction history and trend for use in the flowchart of FIG. 9.
Figure 11:
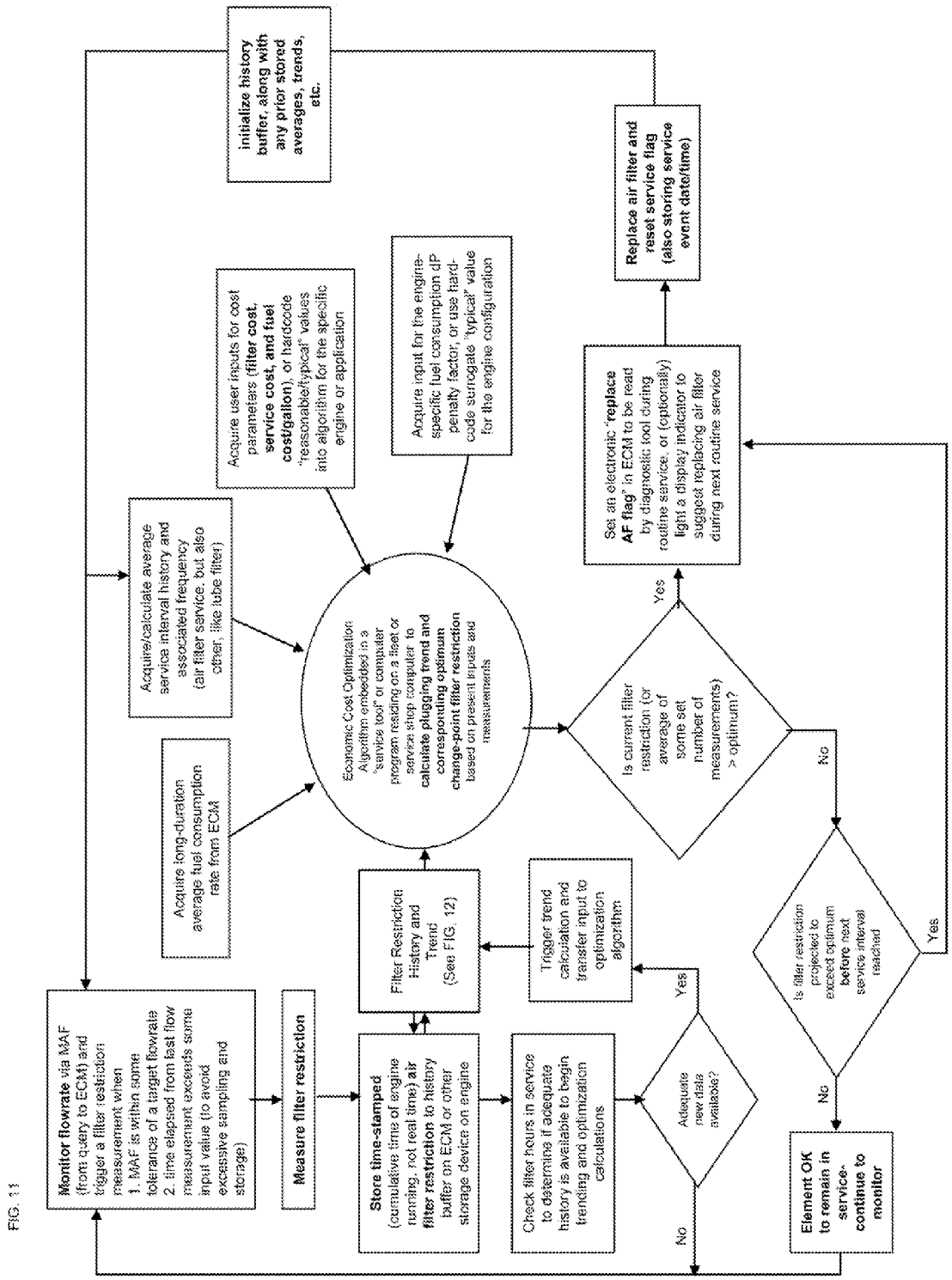
FIG. 11 provides a flowchart example for measuring restriction at "flow-rate set-point" to avoid normalization error.
Figure 12:
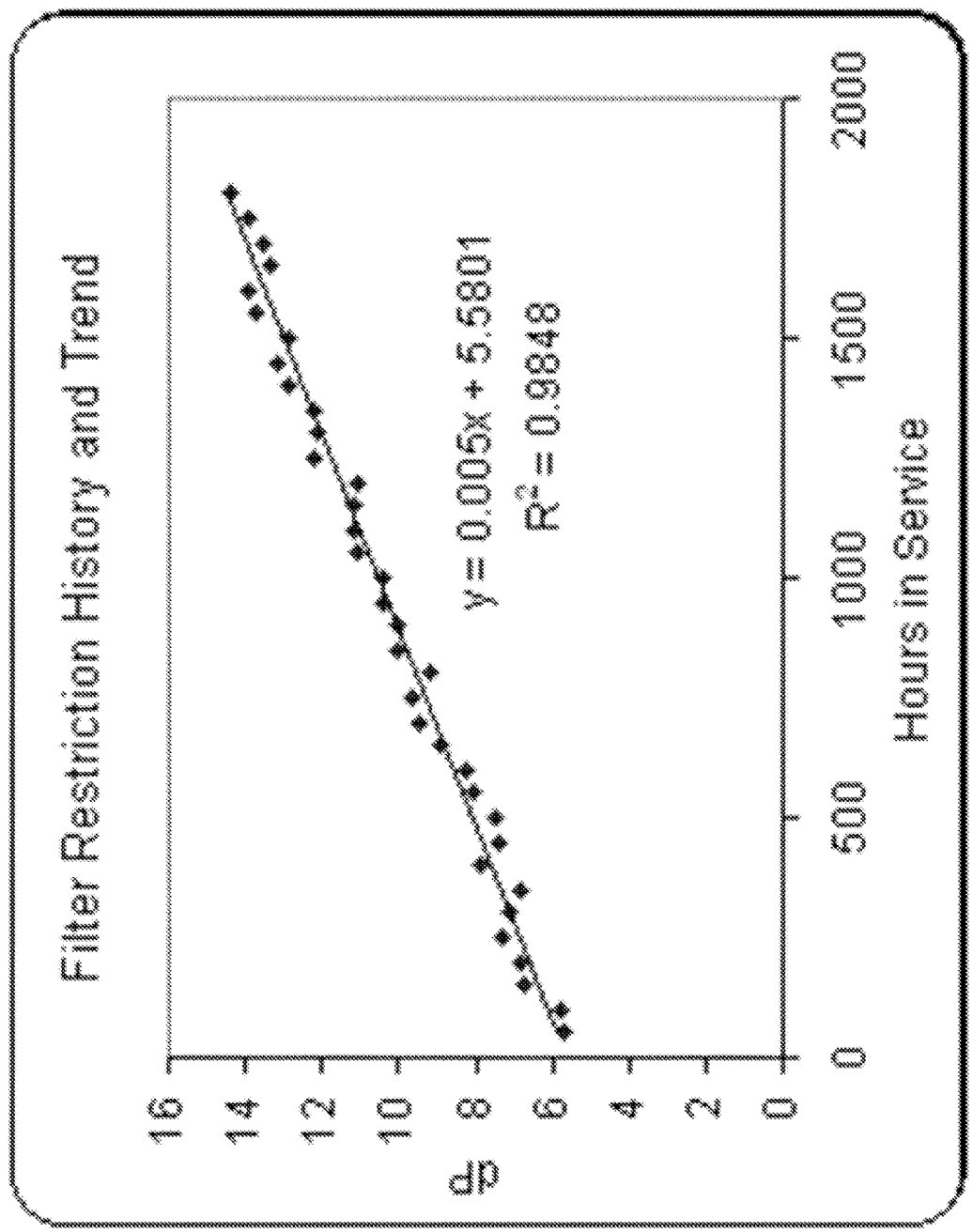
FIG. 12 illustrates graphically a filter restriction history and trend for use in the flowchart of FIG. 11.
Figure 13:
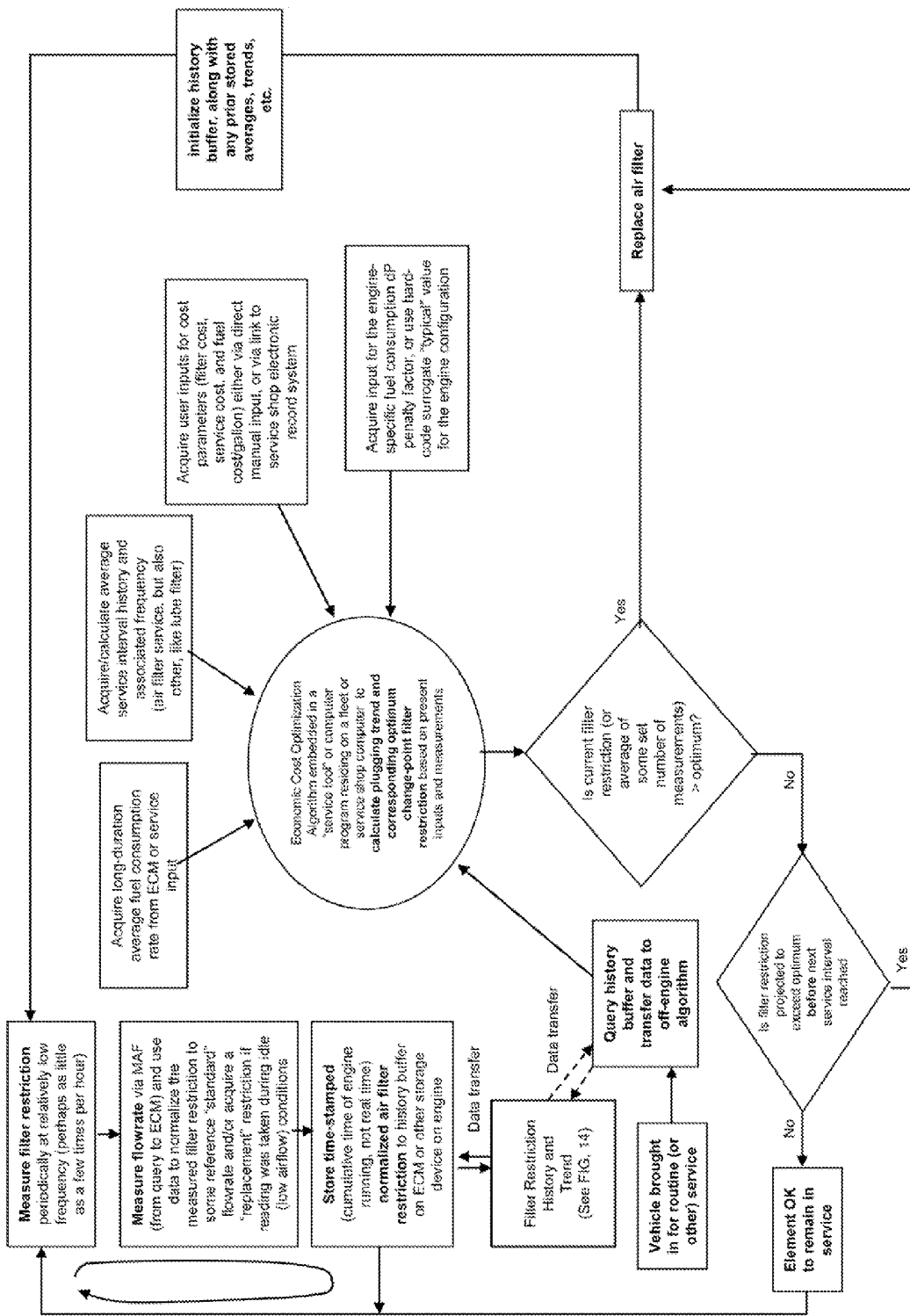
FIG. 13 provides a flowchart example for on-engine measurement of filter plugging rate and off-engine algorithm for service decision.
Figure 14:
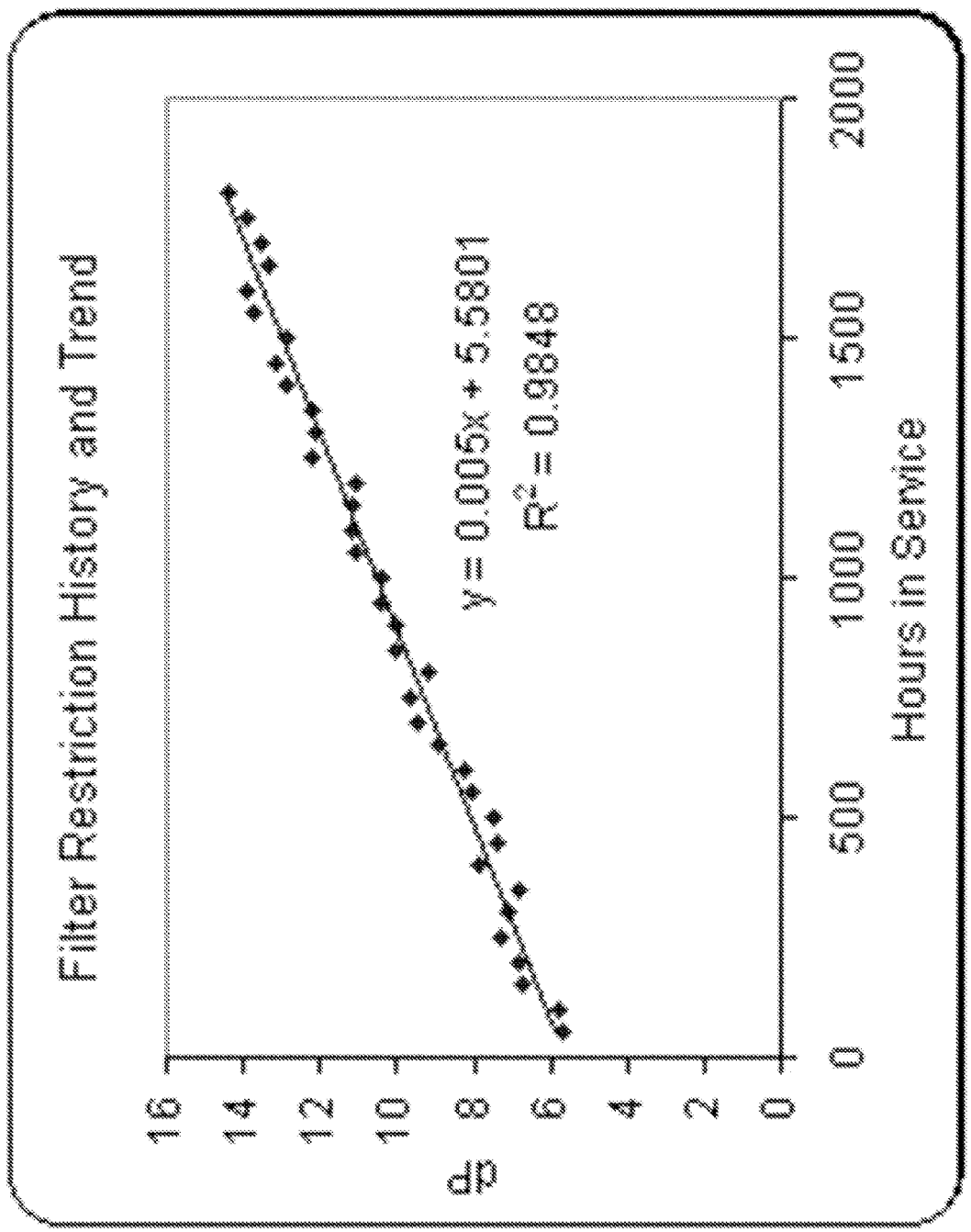
FIG. 14 illustrates graphically a filter restriction history and trend for use in the flowchart of FIG. 13.
Figure 15:
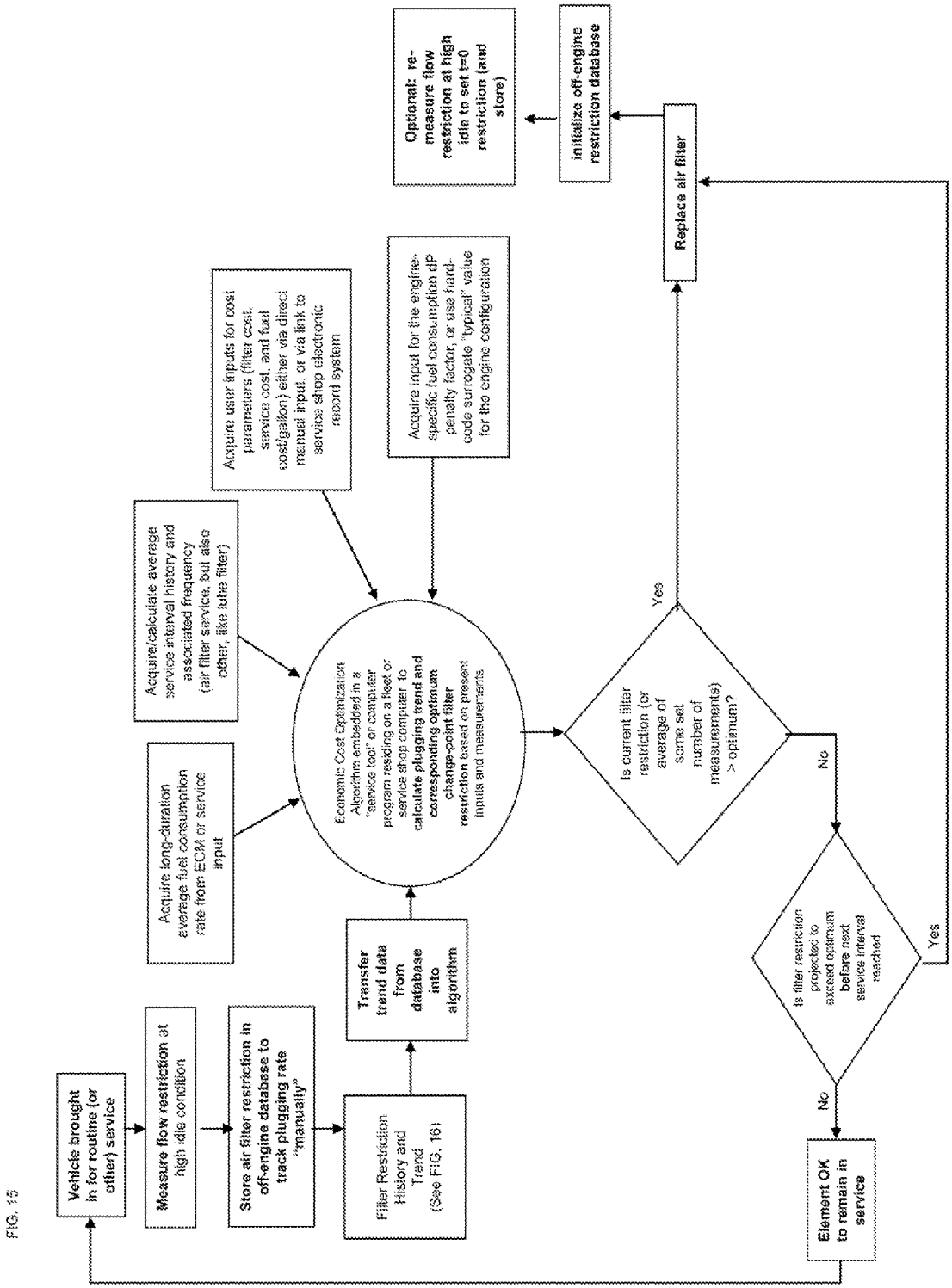
FIG. 15 provides a flowchart example for "manual" measurement & logging of filter plugging rate and off engine algorithm for service decision.
Figure 16:
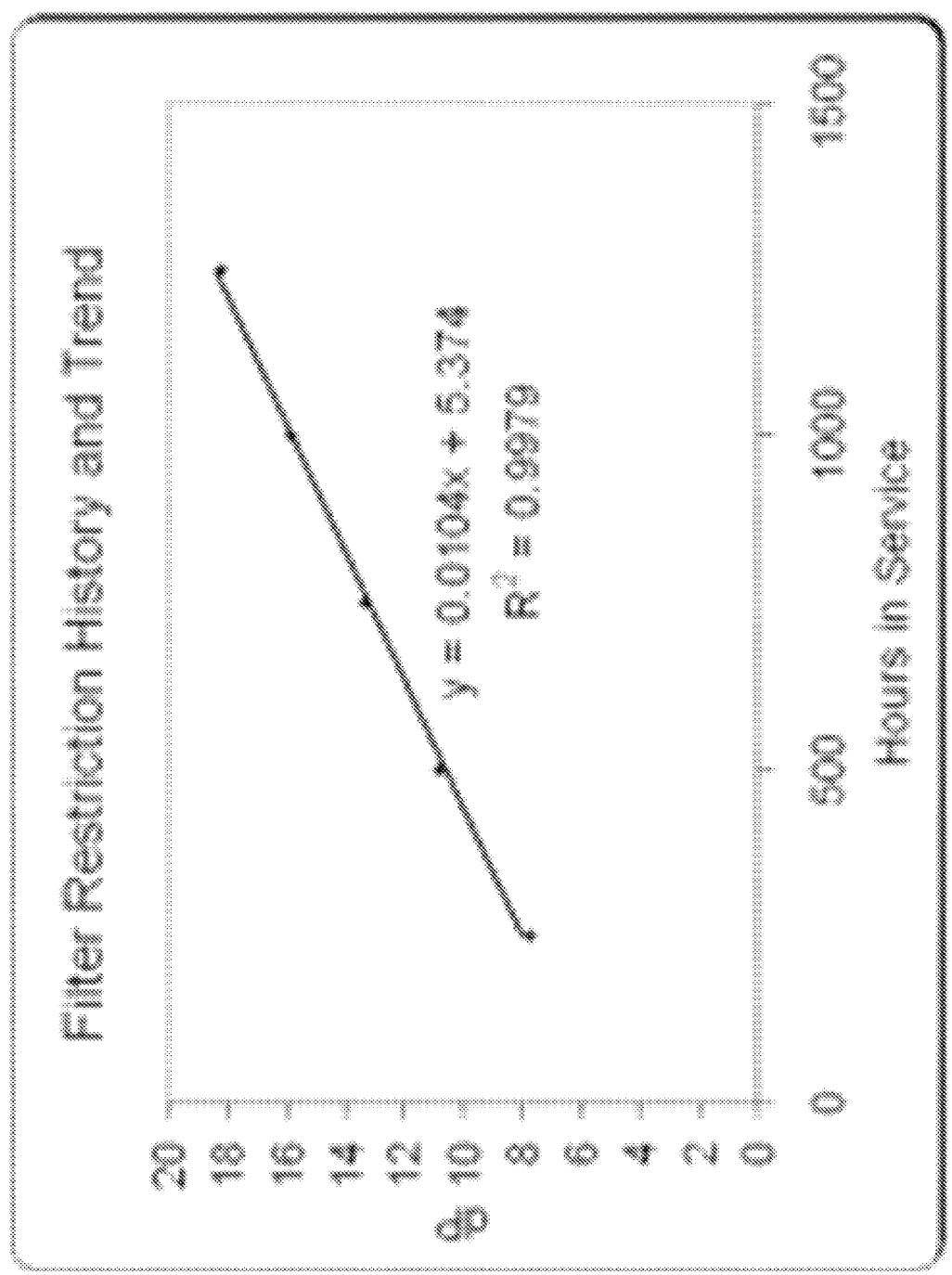
FIG. 16 illustrates graphically a filter restriction history and trend for use in the flowchart of FIG. 15.

The "robustness" of the disclosed methods may be improved by applying flow-correction (either from MAF, or from ECM inferred air flowrate) to filter dP measurement and history, greatly reducing dP noise (due to airflow varying with speed and load) and identifying a plugging trend. This is illustrated conceptually via generated data in FIG. 8.

A service-point optimization algorithm may be performed "on-board". Alternatively, a service-point optimization algorithm may utilize "on-board" data and an "off-board" tool (e.g., at a service shop). For example, a service shop may query and download dP history data that is stored on-board. The service shop may then perform an off-board determination with respect to optimal air filter replacement interval using additional inputs that include air filter price and service hourly rate. A hard-coded on-board version may include a predictive, non-intrusive service signal (e.g., a signal sent to an ECM to change air filter at next service opportunity rather than a dashboard warning light), especially for systems where an optimum change point is at less than 25 in $H_2O$. FIG. 9-16 provide illustrative flow-charts of some embodiments of the methods disclosed herein.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation. It is provisionally and preliminarily expected that the claims may include at least the following.

What is claimed is:

1. A method for providing a user of an internal combustion engine with an economically optimum air filter replacement interval, the method comprising the following steps:
    (a) sensing air filter plugging rate data and engine duty cycle data,
    (b) providing an algorithm that accounts for:
        (i) dP, pressure drop across the air filter,
        (ii) penalty based on increased fuel consumption caused by the pressure drop across the air filter, and
        (iii) the cost of air filter replacement, and
    (c) providing an indication to the user of the optimum air filter replacement interval based on the air filter plugging rate data, the engine duty cycle data, and the algorithm.

2. The method according to claim 1 comprising including in the cost of air filter replacement the cost of a new air filter plus replacement service cost.

3. The method according to claim 2 comprising including in replacement service cost the cost of down time.

4. The method according to claim 1 comprising
    determining a first changing cost comprising increasing incremental fuel cost per mile due to increasing dP;
    determining a second changing cost comprising decreasing air filter cost per mile;
    summing the first and second changing costs to provide a changing sum;
    providing the indication at a minimum of the changing sum.

5. The method according to claim 4 comprising determining the first changing cost, the second changing cost and the sum on a graph having an abscissa of miles between air filter replacement, and having an ordinate of cost per mile.

6. The method according to claim 4 comprising determining the first changing cost, the second changing cost and the sum on a graph having an abscissa of air intake restriction, and having an ordinate of cost per mile.

7. The method according to claim 1 comprising:
    determining a first changing cost comprising increasing incremental fuel cost per hour due to increasing dP;
    determining a second changing cost comprising decreasing air filter cost per hour;
    summing the first and second changing costs to provide a changing sum;
    providing the indication at a minimum of the changing sum.

8. The method according to claim 7 comprising determining the first changing cost, the second changing cost and the sum on a graph having an abscissa of hours between air filter replacement, and having an ordinate of cost per hour.

9. The method according to claim 7 comprising determining the first changing cost, the second changing cost and the sum on a graph having an abscissa of air intake restriction, and having an ordinate of cost per hour.

10. The method according to claim 1 comprising providing a pre-indication alert to the user in advance of the indication.

11. The method according to claim 10 comprising providing the pre-indication alert in advance miles prior to the optimum air filter replacement interval.

12. The method according to claim 10 comprising providing the pre-indication alert in advance hours prior to the optimum air filter replacement interval.

13. The method according to claim 10 wherein the pre-indication alert advises the user to change the air filter at the next regularly scheduled service interval.

14. The method according to claim 1 comprising assuming in the algorithm that dP changes linearly with respect to at least one of miles and hours.

15. The method according to claim 1 comprising assuming in the algorithm that fuel consumption changes linearly with respect to air-intake system dP.

16. The method according to claim 1 comprising assuming in the algorithm that dP changes linearly with respect to at least one of miles and hours, and assuming in the algorithm that fuel consumption changes linearly with respect to dP, and assuming that fuel consumption changes linearly with respect to the one of miles and hours.

17. The method according to claim 1 comprising providing the algorithm in an ECU, electronic control unit, on-board the engine.

18. The method according to claim comprising providing the algorithm in a service tool separate from the engine.

19. The method according to claim 18, wherein the service tool automatically accesses fleet records or data that includes air filter cost, fuel cost, and down-time cost for servicing air filter replacement.

20. The method according to claim 1 comprising assuming, in the algorithm pre-determined relationships between dP, fuel consumption, and at least one of miles and hours, wherein the pre-determined relationships are selected from the group consisting of linear, exponential, quadratic, and power relationships.

21. The method according to claim 1 comprising providing air flow correction of the sensed air filter plugging data.

22. The method according, to claim 1 comprising integrating the sensed air filter plugging data to provide smoothing thereof and prevent false or premature triggering of a filter replacement signal.

23. The method according to claim 1 comprising recording air filter plugging rate data during pre-determined air flowrate conditions to facilitate consistency and uniformity of data points relative to each other and integrity of comparison.

24. The method according to claim 23 comprising selecting the pre-determined air flowrate conditions to be a high enough flowrate to reduce error percentage changes, and normalizing the selected flowrate to a fixed flow condition.

\* \* \* \* \*